United States Patent [19]

Kondo et al.

[11] Patent Number: 5,681,889
[45] Date of Patent: Oct. 28, 1997

[54] HYDROPHILIC CROSSLINKED POLYMER FINE PARTICLES AND PROCESS FOR PRODUCTION THEREOF

[75] Inventors: Masahiro Kondo; Hiroshi Inoue, both of Hiratsuka, Japan

[73] Assignee: Kansai Paint Co., Ltd, Japan

[21] Appl. No.: 573,143

[22] Filed: Dec. 15, 1995

[30] Foreign Application Priority Data

Jun. 20, 1994 [JP] Japan .................... 6-159666

[51] Int. Cl.$^6$ .................. C08J 3/00; C08K 3/20; C08L 29/04; C08L 83/00
[52] U.S. Cl. .................. 524/502; 524/32; 524/35; 524/503; 524/504; 524/506; 524/547; 525/70; 525/72; 525/73; 525/74; 525/77; 525/78; 525/79; 525/80; 525/100; 525/123; 525/165; 525/175; 525/205; 525/208; 525/209; 525/218; 526/89; 526/258; 526/279; 526/303.1
[58] Field of Search .................. 526/89, 258, 264, 526/279, 303.1; 525/70, 72, 73, 74, 77, 78, 79, 80, 100, 123, 165, 175, 176, 205, 208, 209, 218; 524/32, 35, 502, 503, 504, 506, 547

[56] References Cited

FOREIGN PATENT DOCUMENTS

| | | |
|---|---|---|
| 0 116 779 | 8/1984 | European Pat. Off. . |
| 0 349 241 | 1/1990 | European Pat. Off. . |
| 0 614 921 | 9/1994 | European Pat. Off. . |
| 2589145 | 4/1987 | France . |

*Primary Examiner*—Patrick Niland
*Attorney, Agent, or Firm*—Wenderoth, Lind & Ponack

[57] ABSTRACT

The present invention provides hydrophilic crosslinked polymer fine particles made of a copolymer composed of:

2–50% by weight of (a) a monoethylenic monomer having a polyoxyalkylene or polyvinylpyrrolidone chain, 20–97% by weight of (b) a (meth)acrylamide type monoethylenic monomer, 1–30% by weight of (c) a crosslinkable unsaturated monomer selected from the group consisting of compounds having, in the molecule, at least two polymerizable double bonds, and compounds having, in the molecule, at least one functional group selected from hydrolyzable silyl groups and 1,2-epoxy groups and one polymerizable double bond, and 0–50% by weight of (d) other monoethylenic monomer. Said polymer fine particles are superior in polymerization stability as well as in dispersion stability during storage, undergoes no adverse effect by dispersion stabilizer owing to no use of said stabilizer, and are suitably used for formation of a hydrophilic film.

21 Claims, No Drawings

HYDROPHILIC CROSSLINKED POLYMER FINE PARTICLES AND PROCESS FOR PRODUCTION THEREOF

The present invention relates to hydrophilic crosslinked polymer fine particles, particularly hydrophilic crosslinked polymer fine particles suitably used for formation of a hydrophilic film; a process for production of the polymer fine particles; and a hydrophilic film-forming aqueous coating composition containing the polymer fine particles.

As one process for synthesizing hydrophilic crosslinked polymer fine particles, a process is known which comprises conducting dispersion polymerization using acrylamide as a main monomer component, in a water-miscible organic solvent capable of dissolving the monomer components but substantially incapable of dissolving the polymer formed. In this process, however, when the dispersion polymerization is conducted in the absence of any dispersion stabilizer, the polymer fine particles formed are agglomerated and precipitated in many cases; therefore, the dispersion polymerization is conducted generally in the presence of a dispersion stabilizer for formed polymer [see, for example, Japanese Patent Application Kokai (Laid-Open) No. 132705/1992].

Even in the above process using a dispersion stabilizer, however, polymer agglomerates are often formed during the polymerization and, moreover, since the dispersion stabilizer adheres onto the formed polymer particles by mere physical adsorption, the polymer particles have a problem in dispersion stability during storage, depending upon the storage condition. Furthermore, when the polymer particles are used for formation of a film, the uncrosslinked dispersion stabilizer remains in the formed film depending upon the curing system employed, which allows the film to have significantly inferior properties.

Generally, in the dispersion polymerization of a (meth) acrylamide type monomer, a solvent containing a large amount of a lower alcohol is used as the reaction solvent. This solvent, however, has a low flash point; consequently, use of the dispersion obtained from the dispersion polymerization, in coating application has a handling problem.

The main object of the present invention is to provide hydrophilic crosslinked polymer fine particles which are superior in in-solvent polymerization stability as well as in dispersion stability during storage, which undergoes no adverse effect by dispersion stabilizer owing to no use of any dispersion stabilizer, and which can be suitably used for formation of a hydrophilic film.

The other object of the present invention is to provide a hydrophilic film-forming aqueous coating composition containing the above hydrophilic crosslinked polymer fine particles, which can form a film having excellent hydrophilicity.

The present inventors made a study in order to solve the above-mentioned problems of the prior art and, as a result, newly found out that the above problems can be solved by hydrophilic crosslinked polymer fine particles obtained by polymerization of a monomer mixture containing given amounts of essential components, i.e. a monomer having at least one polymerizable double bond and a polyoxyalkylene or polyvinylpyrrolidone chain, a (meth)acrylamide type monomer and a crosslinkable unsaturated monomer. The present invention has been completed based on the finding.

According to the present invention there is provided hydrophilic crosslinked polymer fine particles made of a copolymer composed of:

2–50% by weight of (a) a hydrophilic monomer having, in the molecule, at least one polymerizable double bond and a polyoxyalkylene or polyvinylpyrrolidone chain, 20–97% by weight of (b) at least one (meth)acrylamide type monomer selected from the group consisting of the compounds represented by the following general formula [1]:

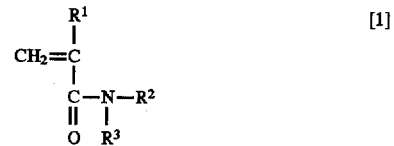

(wherein $R^1$ is a hydrogen atom or a methyl group; and $R^2$ and $R^3$ may be the same or different and are each a hydrogen atom or an alkyl group having 1–5 carbon atoms with a proviso that the sum of the carbon atoms of $R^2$ and $R^3$ is 5 or less), 1–30% by weight of (c) a crosslinkable unsaturated monomer selected from the group consisting of compounds having, in the molecule, at least two polymerizable double bonds, and compounds having, in the molecule, at least one functional group selected from hydrolyzable silyl groups and 1,2-epoxy groups and one polymerizable double bond, and 0–50% by weight of (d) a monomer other than the above (a), (b) and (c), having a polymerizable unsaturated group in the molecule.

The hydrophilic crosslinked polymer fine particles of the present invention are hereinafter described in more detail.

HYDROPHILIC MONOMER (a)

The monomer (a) is a compound having, in the molecule, at least one, preferably one or two, particularly preferably one polymerizable double bond and a polyoxyalkylene or polyvinylpyrrolidone chain. Typical examples thereof are the compounds represented by the following general formulas [2], [3] and [4]:

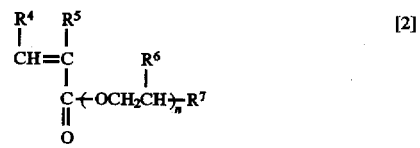

[wherein $R^4$, $R^5$ and $R^6$ may be the same or different and are each a hydrogen atom or a methyl group; n is an integer of 10–200; $R^7$ is —OH, —OCH$_3$, —SO$_3$H or —SO$_3^-$M$^+$ (where M$^+$ is Na$^+$, K$^+$, Li$^+$, NH$_4^+$ or an organic ammonium group); $R^6$s in the n groups represented by:

may be the same or different; the above organic ammonium group may be a primary, secondary, tertiary or quaternary organic ammonium group, and the nitrogen atom has at least one organic group and 0–3 hydrogen atoms bonded thereto; examples of the organic group are an alkyl group of 1–8 carbon atoms, an aryl group and an aralkyl group, all of which may contain a hetero atom(s) such as O, S, N and/or the like],

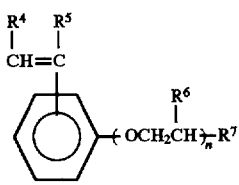

(wherein $R^4$, $R^5$, $R^6$, $R^7$ and n have the same definitions as given above),

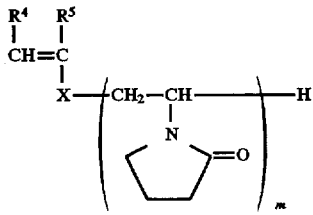

(wherein $R^4$ and $R^5$ have the same definitions as given above; X is a bivalent organic group having 5–10 carbon atoms, which may contain an O, S or N atom(s); and m is an integer of 10–100).

Specific examples of the "bivalent organic group having 5–10 carbon atoms, which may contain an O, S or N atom(s)" represented by X in the above general formula [4] include a group represented by the following formula.

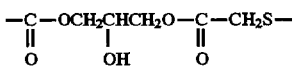

The monomer (a) is preferably a compound of formula [2] or [3], particularly a compound of formula [2] or [3] wherein n is 30–200, particularly 40–150, in view of, for example, the dispersion stability of the resulting polymer fine particles when the monomer (b) is used in a large amount. Particularly preferable is a compound of formula [2] or [3] wherein $R^4$ is a hydrogen atom, $R^5$ is a hydrogen atom or a methyl group, and $R^6$ is a hydrogen atom.

(METH)ACRYLAMIDE TYPE MONOMER (b)

The monomer (b) used for forming the polymer fine particles of the present invention is at least one compound selected from the compounds represented by the following general formula [1]:

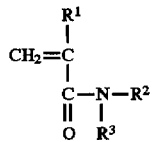

(wherein $R^1$ is a hydrogen atom or a methyl group; and $R^2$ and $R^3$ may be the same or different and are each a hydrogen atom or an alkyl group having 1–5 carbon atoms with a proviso that the sum of the carbon atoms of $R^2$ and $R^3$ is 5 or less).

In the above formula [1], the "alkyl group having 1–5 carbon atoms" which may be represented by $R^2$ or $R^3$, can have a straight chain or a branched chain. Examples thereof are a methyl group, an ethyl group, an n-propyl group, an isopropyl group, an n-butyl group, an isobutyl group, a tert-butyl group and an amyl group.

Typical examples of the monomer (b) represented by the above general formula [1] are acrylamide, methacrylamide, N-methylacrylamide, N-methylmethacrylamide, N,N-dimethylacrylamide, N,N-dimethylmethacrylamide, N-ethylacrylamide, N-ethylmethacrylamide, N-n-propylacrylamide, N-n-propylmethacrylamide, N-isopropylacrylamide, N-isopropylmethacrylamide and N-n-butylacrylamide. Of these, particularly preferable are acrylamide, methaorylamide, N-methylacrylamide and N-methylmethacrylamide.

CROSSLINKABLE UNSATURATED MONOMER (c)

The polymerizable unsaturated monomer (c) used to form the hydrophilic crosslinked polymer fine particles of the present invention is a component contributing to the crosslinking of the fine particles and is at least one compound selected from (c-1) compounds having, in the molecule, at least two polymerizable double bonds and (c-2) compounds having, in the molecule, at least one functional group selected from hydrolyzable silyl groups and 1,2-epoxy groups and one polymerizable double bond.

The compounds (c-1) having, in the molecule, at least two polymerizable double bonds are preferably those compounds having, in the molecule, two to five, particularly two polymerizable double bonds. Examples thereof are methylenebis(meth)acrylamide; di(meth)acrylates of alkylene glycols preferably of 2–10 carbon atoms, such as ethylene glycol di(meth)acrylate, triethylene glycol di(meth)acrylate, tetraethylene glycol di(meth)acrylate, 1,3-butylene glycol di(meth)acrylate, 1,6-hexanediol di(meth)acrylate and the like; polyhydric alcohol (meth)acrylates such as trimethylolpropane tri(meth)acrylate and the like; divinylbenzene; and allyl (meth)acrylate. Of these, methylenebisacrylamide and methylenebismethacrylamide are preferable in view of the dispersion stability, hydrophilicity, etc. of the resin particles obtained. Herein, "(meth)acrylate" refers to methacrylate and acrylate.

The compounds (c-2) having, in the molecule, at least one, preferably only one functional group selected from hydrolyzable silyl groups and 1,2-epoxy groups

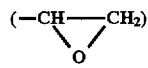

and one polymerizable double bond, include the following compounds. In the present specification, "hydrolyzable silyl group" refers to a group which forms a silanol group (Si—OH) when hydrolyzed, and includes, for example, groups represented by the following formula:

wherein two $R^8$s may be the same or different and are each a hydrogen atom, a hydrocarbon group having 1–18, preferably 1–4 carbon atoms, an alkoxy group having 1–4 carbon atoms or an alkoxy-substituted alkoxy group having 2–4 carbon atoms; and $R^9$ is an alkoxy group having 1–4 carbon atom or an alkoxy-substituted alkoxy group having 2–4 carbon atoms.

Typical examples of the compounds (c-2) are unsaturated compounds having hydrolyzable silyl groups such as γ-methacryloyloxypropyltrimethoxysilane, γ-acryloyloxypropyltrimethoxysilane, vinyltriethoxysilane, vinyltrimethoxysilane, 2-styrylethyltrimethoxysilane, vinyltris(methoxyethoxy)silane and the like; and unsaturated compounds having 1,2-epoxy groups, such as glycidyl (meth)acrylate, allyl glycidyl ether and the like. Of these, glycidyl methacrylate is particularly preferable.

MONOMER (d)

The monomer (d) used as necessary for forming the polymer fine particles of the present invention is a compound other than the above monomers (a), (b) and (c), which has a polymerizable unsaturated group in the molecule and which is copolymerizable with the monomers (a), (b) and (c).

Typical examples of the monomer (d) are $C_{1-24}$ alkyl or cycloalkyl esters of (meth)acrylic acid, such as methyl (meth)acrylate, ethyl (meth)acrylate, butyl (meth)acrylate, hexyl (meth)acrylate, octyl (meth)acrylate, lauryl (meth) acrylate, cyclohexyl (meth)acrylate and the like; $C_{2-8}$ hydroxyalkyl esters of (meth)acrylic acid, such as 2-hydfoxyethyl (meth)acrylate, hydroxypropyl (meth) acrylate, hydroxybutyl (meth)acrylate and the like; carboxyl group-containing unsaturated monomers such as acrylic acid, methacrylic acid, crotonic acid, itaconic acid, maleic acid, fumaric acid, monobutyl itaconate, monobutyl maleate and the like; polymerizable unsaturated nitriles such as acrylonitrile, methacrylonitrile and the like; aromatic vinyl compounds such as styrene, α-methylstyrene, vinyltoluene, α-chlorostyrene and the like; N-methylolacrylamide and N-methylolmethacrylamide; N-alkoxymethyl(meth) acrylamides whose N-alkoxy moiety has 1–4 carbon atoms, such as N-butoxymethylacrylamide, N-butoxymethylmethacrylamide, N-methoxymethylacrylamide and the like; α-olefins such as ethylene, propylene and the like; diene compounds such as butadiene, isoprene and the like; vinyl esters such as vinyl acetate, vinyl propionate and the like; and vinyl ethers such as ethyl vinyl ether, n-propyl vinyl ether and the like. These compounds can be used singly or in combination of two or more of them. Use of a hydrophobic compound in a large amount must be avoided because it gives polymer fine particles of low hydrophilicity.

When there is used, as the monomer (d), a compound having a functional group reactive with the at least one functional group of the monomer (c-2), crosslinking can be allowed to take place by a reaction between the at least one functional group of the monomer (c-2) and the functional group of the monomer (d). Incidentally, when the at least one functional group of the monomer (c-2) is a hydrolyzable silyl group, crosslinking is possible by a reaction between these hydrolyzable silyl groups.

The functional group reactive with the at least one functional group of the monomer (c-2), which the monomer (d) can have, can be exemplified by those shown in the following table.

| Functional group of monomer (c-2) | Functional group reactive with functional group of compound (c-2), which monomer (d) can have |
|---|---|
| Hydrolyzable silyl group | Hydroxyl group, silanol group, hydrolyzable silyl group, etc. |
| 1,2-Epoxy group | Carboxyl group, amino group, hydroxyl group, etc. |

When there is used, as the monomer (c), a compound (c-2) having a 1,2-epoxy group, the whole or part of the monomer (d) must be a polymerizable unsaturated compound having, in the molecule, a functional group (e.g. carboxyl group, amino group or hydroxyl group) reactive with the 1,2-epoxy group, in order to obtain crosslinked polymer fine particles of the present invention.

PRODUCTION OF HYDROPHILIC CROSSLINKED POLYMER FINE PARTICLES

The hydrophilic crosslinked polymer fine particles of the present invention can be produced by polymerizing the hydrophilic monomer (a), (meth)acrylamide type monomer (b), crosslinkable unsaturated monomer (c) and, as necessary, monomer (d) all mentioned above, in the absence of any dispersion stabilizer in a water-miscible organic solvent capable of dissolving the above monomers but substantially incapable of dissolving the copolymer formed or in a mixed solvent of the water-miscible organic solvent and water.

In the polymerization, the proportions of the monomers used can be the same as those desired for the copolymer formed, and can be as follows, for example, Hydrophilic monomer (a)
  2–50% by weight, preferably 2–40% by weight, more preferably 5–35% by weight
(Met)acrylamide type monomer (b)
  20–97% by weight, preferably 40–97% by weight, more preferably 40–90% by weight
Crosslinkable unsaturated monomer (c)
  1–30% by weight, preferably 1–20% by weight, more preferably 1–15% by weight
Monomer (d)
  0–50% by weight, preferably 0–40% by weight, more preferably 0–35% by weight When the amount of the hydrophilic monomer (a) is less than 2% by weight, it is difficult to sufficiently stabilize the polymer particles formed, and agglomerates are easily formed during polymerization or during storage. When the amount is more than 50% by weight, the polymer particles formed dissolve easily in the reaction solvent and a large portion of the polymer formed is dissolved, making it impossible to form polymer fine particles satisfactorily.

When the amount of the (meth)acrylamide type monomer (b) is less than 20% by weight, the polymer formed dissolves easily in the reaction solvent, making it difficult to form polymer fine particles. When the amount is more than 97% by weight, the stability of polymer fine particles during polymerization and during storage is insufficient and agglomerates are formed easily.

When the amount of the crosslinkable unsaturated monomer (c) is less than 1% by weight, the crosslinking degree of the polymer particles formed is low and, when other solvent is added later, the polymer particles may cause swelling and dissolution depending upon the solvent added. When the amount is more than 30% by weight, agglomerates are formed in a large amount during polymerization, making it difficult to produce desired polymer fine particles stably.

The hydrophilic monomer (a) used in production of the polymer fine particles of the present invention contains, in the molecule, a polyoxyalkylene or polyvinylpyrrolidone chain of high hydrophilicity and plays a role of dispersing and stabilizing the polymer formed. Therefore, no use of any dispersion stabilizer is necessary in production of the polymer fine particles of the present invention.

In production of the polymer fine particles of the present invention, there is used, as the reaction solvent, a water-miscible organic solvent capable of dissolving the monomers mixture but substantially incapable of dissolving the copolymer formed, or a mixed solvent of the above water-miscible organic solvent and water. Herein, "water-miscible" refers to "soluble in water at 20° C. in any proportion".

The water-miscible organic solvent can be any organic solvent as long as it satisfies the above requirement. However, particularly preferred from the standpoint of the polymerization stability is a water-miscible organic solvent containing at least 50% by weight, particularly at least 70% by weight of an organic solvent having a solubility parameter (SP) of generally 9–11, particularly 9.5–10.7. Incidentally, "solubility parameter (SP)" used in the present specification is based on the description made in Journal of Paint Technology, Vol. 42, No. 541, pp. 76–118 (February, 1970).

Examples of the organic solvent having a SP of the above range are alkylene glycol monoalkyl ethers such as ethylene glycol monobutyl ether, propylene glycol monomethyl ether, ethylene glycol monoethyl ether, diethylene glycol monoethyl ether, diethylene glycol monobutyl ether and the like. Of these, particularly preferable are ethylene glycol monobutyl ether and propylene glycol monomethyl ether.

The water-miscible organic solvent can contain, besides the organic solvent having a SP of 9–11, other water-miscible or water-immiscible organic solvent. Preferable examples of the other organic solvent are water-miscible organic solvents such as methanol, ethanol, isopropyl alcohol and the like. Desirably, the other organic solvent is used in an amount of 50% by weight or less, particularly 30% by weight or less based on the total amount of the organic solvents.

When a mixed solvent of the water-miscible organic solvent and water is used as the reaction solvent, the preferable content of water in the mixed solvent is generally 60 parts by weight or less, particularly 40 parts by weight or less per 100 parts by weight of the water-miscible organic solvent, in view of the polymerization stability of polymer formed, etc.

The copolymerization of the hydrophilic monomer (a), the (meth)acrylamide type monomer (b), the crosslinkable unsaturated monomer (c) and the monomer (d) is conducted generally in the presence of a radical polymerization initiator. The radical polymerization initiator can be one known per se. Examples thereof are peroxides such as benzoyl peroxide, lauroyl peroxide, di-tert-butyl peroxide, cumene hydroperoxide, tert-butyl peroctoate, tert-butyl peroxy-2-ethylhexanonate and the like; azo compounds such as 2,2'-azobisisobutyronitrile, 2,2'-azobis(2,4-dimethylvaleronitrile), 2,2'-azobis(4-methoxy-2,4-dimethylvaleronitrile), dimethyl 2,2'-azobisisobutyrate, 4,4'-azobis(4-cyanopentanoic acid) and the like; amidine compounds such as 2,2'-azobis(2-amidinopropane) dihydrochloride, 2,2'-azobis(N,N'-dimethyleneisobutylamidine), 2,2'-azobis(N,N'-dimethylene isobutylamidine) dihydrochloride and the like; persulfates such as potassium persulfate and ammonium persulfate and the like; and the combinations of the persulfate with sodium thiosulfate, an amine or the like. These initiators can be used singly or in combination of two or more of them. The amount of the radical polymerization initiator used can be generally 0.2–5% by weight based on the total amount of the monomers.

The polymerization temperature can be varied depending upon the kind of the polymerization initiator used, etc., but an appropriate polymerization temperature is generally about 50°– —about 160°C., particularly 70–160° C. The reaction time can be about 0.1–10 hours.

There is no particular restriction as to the particle diameters of the present polymer fine particles produced as above. However, it is preferable that the polymer fine particles have an average particle diameter of generally 0.03–1 μm, preferably 0.05–0.6 μm in view of the stability of the polymer fine particles formed, the prevention of formation of agglomerates, etc. This average particle diameter can be measured by the use of a particle diameter tester, for example, Coulter Model N4MD (a product of Coulter Co.).

The polymer fine particles of the present invention have, at the surfaces, the chemically bonded polyoxyalkylene or polyvinylpyrrolidone chains derived from the monomer (a), with the chains oriented outward. Therefore, the polymer fine particles, although containing no dispersion stabilizer, are highly superior in polymerization stability in water-miscible organic solvent or in mixed solvent of said water-miscible organic solvent and water, as well as in dispersion stability during storage, and their surfaces are hydrophilic.

Further, the present polymer fine particles are crosslinked inside the particles owing to the presence of the monomer (c) units. Therefore, the polymer fine particles can hold the shape even in a medium (e.g. an aqueous coating) containing a large amount of water or even when heated (the particles are not easily melted by heating).

The present polymer fine particles can find applications in hydrophilizing agent, liquid crystal spacer, column filler, non-staining coating, etc.

The hydrophilic crosslinked polymer fine particles of the present invention can be made, in one preferable application, into a hydrophilic film-forming coating composition by mixing with an water-miscible film-forming resin in an aqueous medium substantially incapable of dissolving the polymer fine particles but capable of dissolving or dispersing the water-miscible film-forming resin.

The water-miscible film-forming resin used in the preparation of the above coating composition can be any resin as long as it does not significantly impair the hydrophilicity of the polymer fine particles, can be dissolved in the aqueous medium or dispersed therein in fine particles (e.g. in the form of an emulsion), and can form a continuous resin film on the surface of the material coated. As the water-miscible film-forming resin, there can be used, for example, a polyvinyl alcohol, a polycarboxymethyl cellulose, an aqueous acrylic resin emulsion, an aqueous polyester emulsion, an aqueous polyurethane emulsion and an ethylene-acrylic acid ionomer resin.

The amount of the water-miscible film-forming resin used can be varied over a wide range depending upon the application of the coating composition, but the resin is preferably used in a weight ratio of hydrophilic crosslinked polymer fine particles/water-miscible film-forming resin, of generally 10/90 to 90/10, particularly 15/85 to 80/20, more particularly 20/80 to 70/30.

As the aqueous medium used in the hydrophilic film-forming coating composition, there can be used water, or a mixed solvent of water and the above-mentioned water-miscible organic solvent wherein the content of water is 50% by weight or more, preferably 70% by weight or more.

The solid content of the coating composition is not particularly restricted, but can be generally 3–60% by weight, preferably 5–50% by weight.

The coating composition may further comprise, as necessary, coating additives such as neutralizing agent, surfactant, curing agent, levelling agent, anti-fungal agent, coloring pigment, rust-preventive pigment, extender pigment and the like. The surfactant includes, for example, a salt of a dialkylsulfosuccinic acid ester and an alkylene oxide silane compound. The curing agent includes, for example, an amino-aldehyde resin, a blocked isocyanate compound, a polyepoxy compound and a chelate compound of a metal selected from Ti, Zr and Al.

The coating composition of the present invention can form a hydrophilic film by being coated on a material to be coated and being dried and can therefore be widely used in applications wherein the formation of a hydrophilic film is desired. The material to be coated is not particularly restricted and includes metals (e.g. iron, aluminum, zinc, copper, tin and metal-plated steel); plastics; glass; wood; and so forth. The film thickness in which the coating composition is coated, is not particularly restricted, either, but can be generally 0.5–5.0 μm as dried film thickness when the material to be coated is an aluminum fin of heat exchanger.

As described above, the hydrophilic crosslinked polymer fine particles are superior in polymerization stability in solvent as well as in dispersion stability during storage, undergo no adverse effect by dispersion stabilizer owing to no use of the stabilizer, and can be suitably used for formation of a hydrophilic film.

The hydrophilic film-forming aqueous coating composition containing the hydrophilic crosslinked polymer fine particles of the present invention, when coated on a material to be coated, can form fine unevenness thereon owing to the presence of hydrophilic resin fine particles and moreover can exhibit excellent hydrophilicity because the fine particles themselves have hydrophilicity. When the coating composition is coated on an aluminum fin to form a film thereon and the resulting fin is subjected to molding, as compared with a case using a conventional coating containing inorganic particles of silica or the like, the abrasion of mold during molding is less because the hydrophilic resin fine particles are softer than the inorganic particles.

The present invention is hereinafter described more specifically by way of Examples. In the followings, parts and % are by weight in all cases.

EXAMPLE 1

300 parts of propylene glycol monomethyl ether was placed in a flask equipped with a nitrogen inlet tube, an Allihn condenser, a dropping funnel and a mechanical stirrer, and heated to 80°C. Then, the following mixture of monomers, water and and an initiator was dropped into the flask in 5 hours. After the dropping, the resulting mixture was kept at 80° C. for 2 hours.

| | |
|---|---|
| Compound of following compound (1) | 30 parts |
| Acrylamide | 37 parts |
| N-methylolacrylamide | 13 parts |
| Methylenebisacrylamide | 7 parts |
| 2-Hydroxyethyl methacrylate | 13 parts |
| Propylene glycol monomethyl ether | 200 parts |
| Deionized water | 67 parts |
| Ammonium persulfate | 1.5 parts |

The resulting dispersion was an opaque white stable dispersion free from any agglomerate, having a solid content of 15% and an average particle diameter (of resin particles) of 133 nm.

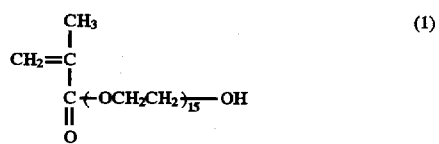

EXAMPLE 2

170 parts of ethylene glycol monobutyl ether was placed in a flask equipped with a nitrogen inlet tube, an Allihn condenser, a dropping funnel and a mechanical stirrer, and heated to 80° C. Then, the following mixture of monomers, water and and an initiator was dropped into the flask in 5 hours. After the dropping, the resulting mixture was kept at 80° C. for 2 hours.

| | |
|---|---|
| Blemmer PME-4000 (*1) | 10 parts |
| Acrylamide | 70 parts |
| Methylenebisacrylamide | 20 parts |
| Ethylene glycol monobutyl ether | 150 parts |
| Deionized water | 80 parts |
| Ammonium persulfate | 1.5 parts |

*¹A compound of the following formula (2) (a product of Nippon Oils and Fats Co., Ltd.)

The resulting dispersion was an opaque white stable dispersion free from any agglomerate, having a solid content of 20% and an average particle diameter (of resin particles) of 320 nm.

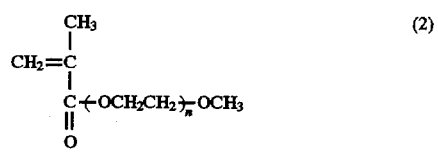

(n is 98 or an average)

PRODUCTION EXAMPLE 1

60 parts of propylene glycol monomethyl ether was fed into a flask equipped with a nitrogen inlet tube, a condenser, a dropping funnel and a mechanical stirrer, and heated to 90° C. Thereto were dropwise added, simultaneously and in 2 hours, a solution consisting of 100 parts of N-vinylpyrrolidone, 2 parts of 2,2'-azobis(isobutyronitrile) and 5 parts of propylene glycol monomethyl ether and a solution consisting of 5 parts of mercaptoacetic acid and 30 parts of propylene glycol monomethyl ether. 1 hour after the dropwise addition, a solution consisting of 1 part of 2,2'-azobis(2,4-dimethylvaleronitrile) and 10 parts of propylene glycol monomethyl ether was dropwise added in 1 hour. The mixture was stirred for 1 hour and then cooled to obtain a polyvinylpyrrolidone solution having a solid content of 50%.

PRODUCTION EXAMPLE 2

To 800 parts of the polyvinylpyrrolidone solution having a solid content of 50%, obtained in Production Example 1 were added 26.6 parts of glycidyl methacrylate and 1.8 parts of tetraethylammonium bromide. The mixture was stirred at 110°C. for 7 hours to obtain a polyvinylpyrrolidone macromonomer solution (solid content: 52%) represented by the following formula

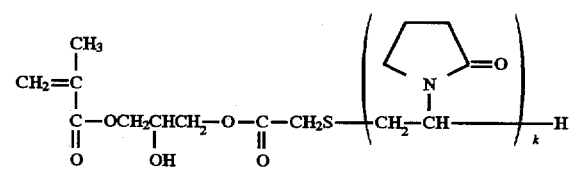

(wherein k has an average value of about 25).

EXAMPLE 3

151.5 parts of propylene glycol monomethyl ether was placed in a flask equipped with a nitrogen inlet tube, an Allihn condenser, a dropping funnel and a mechanical stirrer, and heated to 80° C. Then, the following mixture of monomers, water and and an initiator was dropped into the flask in 5 hours. After the dropping, the resulting mixture was kept at 80° C. for 2 hours.

| | |
|---|---|
| Polyvinylpyrrolidone macromonomer solution having a solid content of 52%, obtained in Production Example 2 | 38.5 parts |
| Acrylamide | 70 parts |
| 1,6-Hexanediol diacrylate | 10 parts |
| Propylene glycol monomethyl ether | 281.5 parts |
| Deionized water | 100 parts |
| 2,2'-Azobisisobutyronitrile | 2 parts |

The resulting dispersion was an opaque white stable dispersion free from any agglomerate, having a solid content of 20% and an average particle diameter (of resin particles) of 280 nm.

EXAMPLE 4

The operation of Example 2 was repeated except that the ethylene glycol monobutyl ether (170 parts) placed first in the flask was changed to propylene glycol monomethyl ether (170 parts) and that the mixture dropped into the flask was changed to the following mixture of monomers, a solvent and an initiator.

| | |
|---|---|
| Blemmer PME-4000 | 5 parts |
| Acrylamide | 93 parts |
| Methylenebisacrylamide | 2 parts |
| Propylene glycol monomethyl ether | 150 parts |
| Deionized water | 80 parts |
| Ammonium persulfate | 1.5 parts |

The resulting dispersion was an opaque white stable dispersion having a solid content of 20% and an average particle diameter (of resin particles) of 800 nm.

EXAMPLE 5

Polymerization was conducted in the same manner as in Example 4 except that the mixture dropped into the flask was changed to the following mixture of monomers, a solvent and an initiator.

| | |
|---|---|
| Blemmer PME-4000 | 40 parts |
| Acrylamide | 55 parts |
| Methylenebisacrylamide | 5 parts |
| Propylene glycol monomethyl ether | 150 parts |
| Deionized water | 80 parts |
| Ammonium persulfate | 1.5 parts |

The resulting dispersion was an opaque white stable dispersion having a solid content of 20% and an average particle diameter (of resin particles) of 68 nm.

EXAMPLE 6

Polymerization was conducted in the same manner as in Example 4 except that the mixture dropped into the flask was changed to the following mixture of monomers, a solvent and an initiator.

| | |
|---|---|
| Blemmer PME-4000 | 30 parts |
| Acrylamide | 40 parts |
| Methylenebisacrylamide | 10 parts |
| N-methylolacrylamide | 20 parts |
| Propylene glycol monomethyl ether | 150 parts |
| Deionized water | 80 parts |
| Ammonium persulfate | 1.5 parts |

The resulting dispersion was an opaque white stable dispersion having a solid content of 20% and an average particle diameter (of resin particles) of 162 nm.

EXAMPLE 7

Polymerization was conducted in the same manner as in Example 4 except that the mixture dropped into the flask was changed to the following mixture of monomers, a solvent and an initiator.

| | |
|---|---|
| Blemmer PME-4000 | 30 parts |
| Acrylamide | 60 parts |
| KBM-503 (a product of SHIN-ETSU CHEMICAL CO., LTD. | 10 parts |
| Propylene glycol monomethyl ether | 150 parts |
| Deionized water | 80 parts |
| Ammonium persulfate | 1.5 parts |

The resulting dispersion was an opaque white stable dispersion having a solid content of 20% and an average particle diameter (of resin particles) of 128 nm.

EXAMPLE 8

Polymerization was conducted in the same manner as in Example 4 except that the mixture dropped into the flask was changed to the following mixture of monomers, a solvent and an initiator.

| | |
|---|---|
| Blemmer PME-4000 | 30 parts |
| Acrylamide | 50 parts |
| Acrylic acid | 10 parts |
| Glycidyl methacrylate | 10 parts |
| Propylene glycol monomethyl ether | 150 parts |
| Deionized water | 80 parts |
| Ammonium persulfate | 1.5 parts |

The resulting dispersion was an opaque white stable dispersion having a solid content of 20% and an average particle diameter (of resin particles) of 163 nm.

EXAMPLE 9

Polymerization was conducted in the same manner as in Example 4 except that the mixture dropped into the flask was changed to the following mixture of monomers, a solvent and an initiator.

| | |
|---|---|
| Blemmer PME-4000 | 30 parts |
| Methacrylamide | 60 parts |
| Allyl methacrylate | 10 parts |
| Propylene glycol monomethyl ether | 150 parts |
| Deionized water | 80 parts |
| Ammonium persulfate | 1.5 parts |

The resulting dispersion was an opaque white stable dispersion having a solid content of 20% and an average particle diameter (of resin particles) of 150 nm.

COMPARATIVE EXAMPLE 1

Polymerization was conducted in the same manner as in Example 1 except that the mixture dropped into the flask was changed to the following mixture of monomers, a solvent and an initiator.

| | |
|---|---|
| Acrylamide | 37 parts |
| N-methyloacrylamide | 13 parts |
| Methylenebisacrylamide | 7 parts |
| 2-Hydroxyethyl methacrylate | 13 parts |
| Propylene glycol monomethyl ether | 200 parts |
| Deionized water | 67 parts |
| Ammonium persulfate | 1.5 parts |

The resulting polymer was large agglomerates and no dispersion of resin particles could be obtained.

COMPARATIVE EXAMPLE 2

Polymerization was conducted in the same manner as in Example 2 except that the Blemmer PME-4000 (10 parts) was replaced by Polyethylene Glycol 4000 (10 parts) (a polyethylene glycol having a molecular weight of about 4,000, a reagent manufactured by WAKO PURE CHEMICAL INDUSTRIES, LTD.).

The resulting polymer was large agglomerates and no dispersion of resin particles could be obtained.

COMPARATIVE EXAMPLE 3

Polymerization was conducted in the same manner as in Example 3 except that the polyvinylpyrrolidone macromonomer (38.5 parts) having a solid content of 52%, obtained in Production Example 2 was replaced by the polyvinylpyrrolidone solution (40 parts) having a solid content of 50%, obtained in Production Example 1. The resulting polymer was large agglomerates and no dispersion of resin particles could be obtained.

COMPARATIVE EXAMPLE 4

Polymerization was conducted in the same manner as in Example 4 except that the mixture dropped into the flask was changed to the following mixture of monomers, a solvent and an initiator.

| | |
|---|---|
| Blemmer PME-4000 | 1 part |
| Acrylamide | 89 parts |
| Methylenebisacrylamide | 10 parts |
| Propylene glycol monomethyl ether | 150 parts |
| Deionized water | 80 parts |
| Ammonium persulfate | 1.5 parts |

The resulting polymer was large agglomerates and no stable dispersion could be obtained.

COMPARATIVE EXAMPLE 5

Polymerization was conducted in the same manner as in Example 4 except that the mixture dropped into the flask was changed to the following mixture of monomers, a solvent and an initiator.

| | |
|---|---|
| Blemmer PME-4000 | 55 parts |
| Acrylamide | 40 parts |
| Methylenebisacrylamide | 5 parts |
| Propylene glycol monomethyl ether | 150 parts |
| Deionized water | 80 parts |
| Ammonium persulfate | 1.5 parts |

The resulting polymer was not granulated and gelled.

COMPARATIVE EXAMPLE 6

Polymerization was conducted in the same manner as in Example 4 except that the mixture dropped into the flask was changed to the following mixture of monomers, a solvent and an initiator.

| | |
|---|---|
| Blemmer PME-4000 | 30 parts |
| Acrylamide | 15 parts |
| Methylenebisacrylamide | 20 parts |
| 2-Hydroxyethyl methacrylate | 35 parts |
| Propylene glycol monomethyl ether | 150 parts |
| Deionized water | 80 parts |
| Ammonium persulfate | 1.5 parts |

The resulting polymer was not granulated and gelled.

COMPARATIVE EXAMPLE 7

Polymerization was conducted in the same manner as in Example 4 except that the mixture dropped into the flask was changed to the following mixture of monomers, a solvent and an initiator.

| | |
|---|---|
| Blemmer PME-4000 | 20 parts |
| Acrylamide | 80 parts |
| Propylene glycol monomethyl ether | 150 parts |
| Deionized water | 80 parts |
| Ammonium persulfate | 1.5 parts |

The resulting dispersion was an opaque white stable dispersion having a solid content of 20% and an average particle diameter (of resin particles) of 167 nm. The dispersion, however, was soluble in water.

COMPARATIVE EXAMPLE 8

Polymerization was conducted in the same manner as in Example 4 except that the mixture dropped into the flask was changed to the following mixture of monomers, a solvent and an initiator.

| | |
|---|---|
| Blemmer PME-4000 | 20 parts |
| Acrylamide | 40 parts |
| 1,6-Hexanediol diacrylate | 40 parts |
| Propylene glycol monomethyl ether | 320 parts |
| Deionized water | 80 parts |
| Ammonium persulfate | 1.5 parts |

The resulting polymer was large agglomerates and no stable dispersion could be obtained.

COMPARATIVE EXAMPLE 9

Polymerization was conducted in the same manner as in Example 4 except that the mixture dropped into the flask was changed to the following mixture of monomers, a solvent and an initiator.

| | |
|---|---|
| Blemmer PME-4000 | 20 parts |
| Acrylamide | 15 parts |
| Methyl methacrylate | 55 parts |
| Methylenebisacrylamide | 10 parts |
| Propylene glycol monomethyl ether | 220 parts |
| Deionized water | 180 parts |
| Ammonium persulfate | 1.5 parts |

The resulting dispersion was an opaque white dispersion having a solid content of 20% and an average particle diameter (of resin particles) of 257 nm.

PREPARATION OF HYDROPHILIC FILM-FORMING COATING COMPOSITIONS

Using the dispersions of resin fine particles, obtained in Examples 1–9 and Comparative Examples 7 and 9, the hydrophilic film-forming coating compositions of Examples 10–20 and Comparative Examples 10–11 shown below were prepared.

EXAMPLES 10–20 AND COMPARATIVE EXAMPLES 10–11

Hydrophilic film-forming coating compositions were prepared by mixing and stirring the following components in the following amounts.

An aqueous PVA solution (solid content: 16%) obtained by dissolving, in water, a almost completely saponified PVA [Poval PVA-117 (trade name) manufactured by Kuraray Co., Ltd.]
100 parts (16 parts as solid)
Diisopropoxy-bis(acetylacetonato)titanium
1 part
Dispersion of resin fine particles, obtained in one of Examples 1–9 and Comparative Examples 7 and 9
Parts (as solid) shown in Table 1

<TEST METHODS>

Preparation of Coated Plates for Test

Each of the hydrophilic film-forming coating compositions obtained in Examples 7–14 and Comparative Examples 9–10 was coated on a chromate-treated aluminum plate (A1050; thickness: 0.1 mm) in a film thickness (as dried) of 1 μm by the use of a bar coater. The resulting aluminum plate was subjected to baking for 45 seconds in a hot air of 220° C. so that the temperature of the aluminum plate reached 215° C., whereby a coated plate was obtained. A volatile press oil was applied onto the coated plate, followed by drying at 150° C. for 5 minutes, to obtain various coated plates for test. Each of the coated plates for test was tested for hydrophilicty (water wettability and contact angle of water drop) according to the following test methods. The test results are shown in Table 1.

Tests for Hydrophilicity

Each of the following two coated plates was tested for water wettability and contact angle of water drop according to the following methods.

(1) A coated plate for test obtained above (2) A coated plate obtained by immersing the coated plate (1) in a running tap water [running rate=15 kg/hr per $m^2$ of the coated plate (1)] for 7 hours, pulling it up, drying it in a room for 17 hours (this wet and dry process is hereinafter referred to as wet and dry cycle), and repeating the wet and dry cycle five times (five cycles).

Water Wettability

A coated plate (1) or (2) was immersed in a tap water placed in a beaker, for 10 seconds and then pulled up. Immediately, the water-wet condition of the plate surface was examined visually and rated according to the following yardstick.

o: The whole plate surface is wetted with water and, even after 10 seconds from the pulling-up of plate, there is no unevenness of water on the surface.

Δ: The whole plate surface is wetted with water right after the pulling-up of plate but, after 10 seconds therefrom, water is present mostly on the center of the plate by water movement from the plate edge towards the center.

X: Water drops are formed right after the pulling-up of plate and the whole plate surface is not wetted.

Contact Angle of Water Drop

The contact angle between coated plate (1) or (2) and water was measured by drying the plate at 80° C. for 5 minutes and then subjecting the plate to contact angle measurement using a contact angle meter DCAA (a product of Kyowa Kagaku K. K.).

TABLE 1

| | Dispersion of resin fine particles | | Hydrophilicity | | | |
|---|---|---|---|---|---|---|
| | | | Initial | | After 5 wet and dry cycles | |
| | Kind | Amount (parts as solid content) | Water wettability | Contact angle of water | Water wettability | Contact angle of water |
| Example 10 | Example 1 | 7 | ○ | 10° | ○ | 20° |
| Example 11 | Example 2 | 7 | ○ | 4° | ○ | 10° |
| Example 12 | Example 3 | 7 | ○ | 10° | ○ | 12° |
| Example 13 | Example 4 | 7 | ○ | 10° | ○ | 16° |
| Example 14 | Example 5 | 7 | ○ | 4° | ○ | 10° |
| Example 15 | Example 6 | 7 | ○ | 6° | ○ | 14° |
| Example 16 | Example 7 | 7 | ○ | 4° | ○ | 12° |
| Example 17 | Example 8 | 7 | ○ | 10° | ○ | 18° |
| Example 18 | Example 9 | 7 | ○ | 6° | ○ | 14° |
| Example 19 | Example 2 | 4 | ○ | 10° | ○ | 20° |
| Example 20 | Example 2 | 15 | ○ | 3° | ○ | 10° |
| Comparative | Comparative | 7 | Δ | 15° | X | 30° |

TABLE 1-continued

| | Dispersion of resin fine particles | | Hydrophilicity | | |
| | | | Initial | | After 5 wet and dry cycles |
| | Kind | Amount (parts as solid content) | Water wettability | Contact angle of water | Water wettability | Contact angle of water |
|---|---|---|---|---|---|---|
| Example 10 Comparative Example 11 | Example 7 Comparative Example 9 | 7 | ○ | 25° | Δ | 40° |

What is claimed is:

1. Hydrophilic crosslinked polymer fine particles having an average particle diameter of 0.03–1 µm, which are made of a copolymer composed of:

2–50% by weight of (a) a hydrophilic monomer having, in the molecule, at least one polymerizable double bond and a polyoxyalkylene or polyvinylpyrrolidone chain, 20–97% by weight of (b) at least one (meth)acrylamide monomer selected from the group consisting of the compounds represented by the following general formula (1):

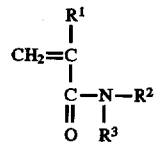
[1]

(wherein $R^1$ is a hydrogen atom or a methyl group; and $R^2$ and $R^3$ may be the same or different and are each a hydrogen atom or an alkyl group having 1–5 carbon atoms with a proviso that the sum of the carbon atoms of $R^2$ and $R^3$ is 5 or less), 1–30% by weight of (c) a crosslinkable unsaturated monomer selected from the group consisting of compounds having, in the molecule, at least two polymerizable double bonds, and compounds having, in the molecule, at least one functional group selected from hydrolyzable silyl groups and 1,2-epoxy groups and one polymerizable double bond, and 0–50% by weight of (d) a monomer other than the above (a), (b) and (c), having a polymerizable unsaturated group in the molecule.

2. Polymer fine particles according to claim 1, wherein the hydrophilic monomer (a) is selected from the group consisting of the compounds represented by the following general formulas (2), (3) and (4):

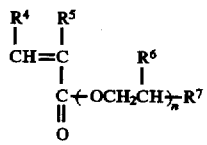
(2)

(wherein $R^4$, $R^5$ and $R^6$ may be the same or different and are each a hydrogen atom or a methyl group; n is an integer of 10–200; $R^7$ is —OH, —OCH$_3$, —SO$_3$H or —SO$_3^-M^+$ (where $M^+$ is Na$^+$, K$^+$, Li$^+$, NH$_4^+$ or an organic ammonium group); and $R^6$ is in the n groups represented by:

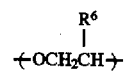

may be the same or different),

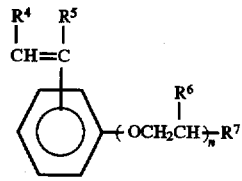
(3)

(wherein $R^4$, $R^5$, $R^6$, $R^7$ and n have the same definitions as given above),

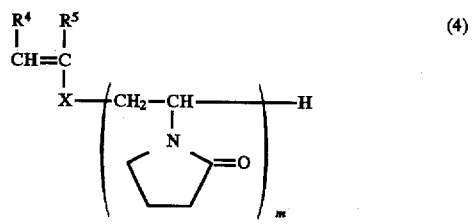
(4)

(wherein $R^4$ and $R^5$ have the same definitions as given above; X is a bivalent organic group having 5–10 carbon atoms, which may contain and O, S or N atoms(s); and m is an integer of 10–100).

3. Polymer fine particles according to claim 1, wherein the hydrophilic monomer (a) has one polymerizable double bond in the molecule.

4. Polymer fine particles according to claim 2, wherein the hydrophilic monomer (a) are a compound of formula (2) or (3).

5. Polymer fine particles according to claim 4, wherein n is an integer of 30–200.

6. Polymer fine particles according to claim 4, wherein $R^4$ is a hydrogen atom, $R^5$ is a hydrogen atom or a methyl group, and $R^6$ is a hydrogen atom.

7. Polymer fine particles according to claim 1, wherein the (meth)acrylamide monomer (b) is selected from the group consisting of acrylamide, methacrylamide, N-methylacrylamide, N-methylmethacrylamide, N,N-dimethylacrylamide, N,N-dimethylmethacrylamide, N-ethylacrylamide, N-ethylmethacrylamide, N-n-propylacrylamide, N-n-propylmethacrylamide, N-isopropylacrylamide, N-isopropylmethacrylamide and N-n-butylacrylamide.

8. Polymer fine particles according to claim 1, wherein the crosslinkable unsaturated monomer (c) has two to five polymerizable double bonds in the molecule.

9. Polymer fine particles according to claim 8, wherein the crosslinkable unsaturated monomer (c) is selected from the group consisting of methylenebis(meth)acrylamide, ethylene glycol di(meth)acrylate, triethylene glycol di(meth)acrylate, tetraethylene glycol di(meth)acrylate, 1,3-butylene glycol di(meth)acrylate, 1,6-hexanediol di(meth)acrylate, trimethylolpropane tri(meth)acrylate, divinylbenzene and allyl (meth)acrylate.

10. Polymer fine particles according to claim 1, wherein the crosslinkable unsaturated monomer (c) is a compound having, in the molecule, one functional group selected from a hydrolyzable silyl group and a 1,2-epoxy group and one polymerizable double bond.

11. Polymer fine particles according to claim 10, wherein the crosslinkable unsaturated monomer (c) is selected from the group consisting of γ-methacryloyloxypropyltrimethoxysilane, γ-acryloyloxypropyltrimethoxysilane, vinyltriethoxysilane, vinyltrimethoxysilane, 2-styrylethyltrimethoxysilane, vinyltris(methoxyethoxy)silane, glycidyl (meth)acrylate and allyl glycidyl ether.

12. Polymer fine particles according to claim 1, wherein the crosslinkable unsaturated monomer (c) is selected from the group consisting of methylenebisacrylamide, methylenebismethacrylamide and glycidyl methacrylate.

13. Polymer fine particles according to claim 1, wherein the monomer (d) is selected from the group consisting of a $C_{1-24}$ alkyl or cycloalkyl ester of (meth)acrylic acid, a $C_{2-8}$ hydroxyalkyl ester of (meth)acrylic acid, a carboxyl group-containing unsaturated monomer, a polymerizable unsaturated nitrile, an aromatic vinyl compound, a N—$C_{1-5}$ alkoxymethyl (meth)acrylamide, an α-olefin, a diene compound, a vinyl ester and a vinyl ether.

14. Polymer fine particles according to claim 1, made of a copolymer composed of:

2–40% by weight of the hydrophilic monomer (a),

40–97% by weight of the (meth)acrylamide type monomer (b),

1–20% by weight of the crosslinkable unsaturated monomer (c), and

0–40% by weight of the monomer (d).

15. Polymer fine particles according to claim 1, which are produced by polymerizing the hydrophilic monomer (a), the (meth)acrylamide monomer (b), the crosslinking unsaturated monomer (c) and, as necessary, the monomer (d) in the absence of any dispersion stabilizer in a water-miscible organic solvent capable of dissolving the above monomers but substantially incapable of dissolving the copolymer formed or in a mixed solvent of said water-miscible organic solvent and water.

16. A process for producing hydrophilic cross-linked polymer fine particles having an average particle diameter of 0.03–1 μm, which process comprises polymerizing:

2–50% by weight of (a) a hydrophilic monomer having, in the molecule, at least one polymerizable double bond and a polyoxyalkylene or polyvinylpyrrolidone chain, 20–97% by weight of (b) at least one (meth)acrylamide monomer selected from the group consisting of the compounds represented by the following general formula [1]:

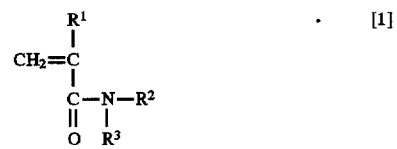

(wherein $R^1$ is a hydrogen atom or a methyl group; and $R^2$ and $R^3$ may be the same or different and are each a hydrogen atom or an alkyl group having 1–5 carbon atoms with a proviso that the sum of the carbon atoms of $R^2$ and $R^3$ is 5 or less), 1–30% by weight of (c) a crosslinkable unsaturated monomer selected from the group consisting of compounds having, in the molecule, at least two polymerizable double bonds, and compounds having, in the molecule, at least one functional group selected from hydrolyzable silyl groups and 1,2-epoxy groups and one polymerizable double bond, and 0–50% by weight of (d) a monomer other than the above (a), (b) and (c), having a polymerizable unsaturated group in the molecule, in the absence of any dispersion stabilizer in a water-miscible organic solvent capable of dissolving the above monomers but substantially incapable of dissolving the copolymer formed or in a mixed solvent of said water-miscible organic solvent and water.

17. A process according to claim 16, wherein the water-miscible organic solvent has a solubility parameter of 9–11.

18. A process according to claim 16, wherein the polymerization is conducted at a temperature of 90°–160° C.

19. A hydrophilic film-forming coating composition comprising:

hydrophilic crosslinked polymer fine particles according to claim 1, an water-miscible film-forming resin, and an aqueous medium substantially incapable of dissolving said polymer fine particles but capable of dissolving or dispersing said water-miscible film-forming resin.

20. A composition according to claim 19, wherein the water-miscible film-forming resin is selected from the group consisting of a polyvinyl alcohol, a polycarboxymethyl cellulose, an aqueous acrylic resin emulsion, an aqueous polyester emulsion, an aqueous polyurethane emulsion and an ethylene-acrylic acid ionomer resin.

21. A composition according to claim 19, wherein the weight ratio of the hydrophilic crosslinked polymer fine particles/the water-miscible film-forming resin is 10/90 to 90/10.

* * * * *